(12) United States Patent
Kohno et al.

(10) Patent No.: US 7,862,952 B2
(45) Date of Patent: Jan. 4, 2011

(54) MEMBRANE ELECTRODE COMPOSITE MODULE, FUEL CELL AND ELECTRONIC EQUIPMENT, AND METHOD OF MANUFACTURING THE MEMBRANE ELECTRODE COMPOSITE MODULE

(75) Inventors: Ryuji Kohno, Kasumigaura (JP); Tatsuya Nagata, Ishioka (JP); Makoto Kitano, Tsuchiura (JP); Masahiro Seido, Tokyo (JP); Kazuhiko Nakagawa, Tokyo (JP)

(73) Assignees: Hitachi, Ltd., Tokyo (JP); Hitachi Cable, Ltd., Tokyo (JP)

( * ) Notice: Subject to any disclaimer, the term of this patent is extended or adjusted under 35 U.S.C. 154(b) by 1078 days.

(21) Appl. No.: 11/176,358

(22) Filed: Jul. 8, 2005

(65) Prior Publication Data

US 2006/0024555 A1  Feb. 2, 2006

(30) Foreign Application Priority Data

Jul. 12, 2004  (JP) ............................. 2004-204807

(51) Int. Cl.
*H01M 8/10*  (2006.01)
*H01M 4/64*  (2006.01)

(52) U.S. Cl. ..................... 429/483; 429/517; 429/519
(58) Field of Classification Search ................. 429/35, 429/30, 44, 32, 483, 517, 519
See application file for complete search history.

(56) References Cited

U.S. PATENT DOCUMENTS

| | | | |
|---|---|---|---|
| 5,084,364 A * | 1/1992 | Quaadvliet | 429/34 |
| 6,361,892 B1 * | 3/2002 | Ruhl et al. | 429/30 |
| 6,991,868 B2 * | 1/2006 | Lee et al. | 429/38 |
| 7,214,442 B2 * | 5/2007 | Ramsey et al. | 429/39 |
| 7,316,858 B2 * | 1/2008 | Cho et al. | 429/38 |
| 7,344,798 B2 * | 3/2008 | Vyas et al. | 429/38 |
| 2003/0143452 A1 * | 7/2003 | Ito et al. | 429/34 |

FOREIGN PATENT DOCUMENTS

| | | |
|---|---|---|
| CN | 1372700 A | 10/2002 |
| JP | 2949153 | 7/1999 |
| JP | 2003-68325 | 3/2003 |

\* cited by examiner

*Primary Examiner*—Patrick Ryan
*Assistant Examiner*—Thomas H. Parsons
(74) *Attorney, Agent, or Firm*—Antonelli, Terry, Stout & Kraus, LLP.

(57) ABSTRACT

According to the present invention, there is provided a membrane electrode composite module including a membrane electrode composite formed by sandwiching both surfaces of an electrolyte membrane between gas diffusion electrodes, an anode current collecting plate having fuel flow holes through which fuel flows, and a cathode current collecting plate having oxygen flow holes through which oxygen flows, wherein both surfaces of the membrane electrode composite are sandwiched between the anode current collecting plate and the cathode current collecting plate, the membrane electrode composite module further including films made of a synthetic resin (a first film and a second film) which are a base of the anode current collecting plate and a base of the cathode current collecting plate.

16 Claims, 10 Drawing Sheets

FIG.1
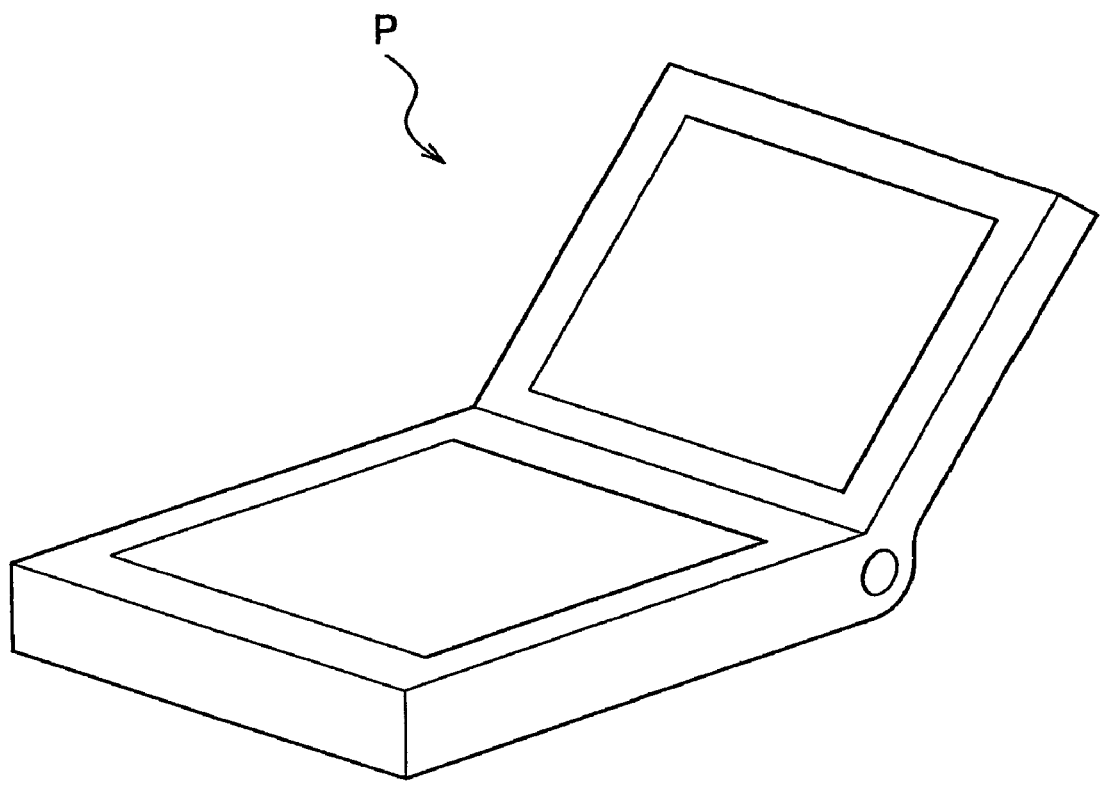
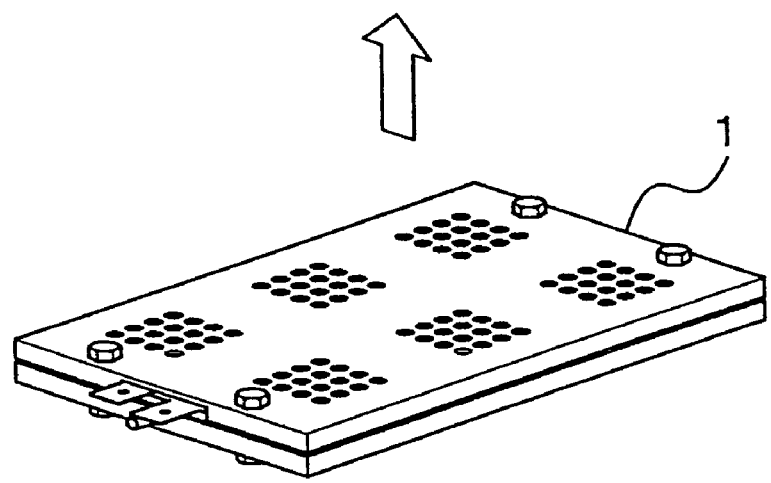

MEMBRANE ELECTRODE COMPOSITE MODULE, FUEL CELL AND ELECTRONIC EQUIPMENT, AND METHOD OF MANUFACTURING THE MEMBRANE ELECTRODE COMPOSITE MODULE

BACKGROUND OF THE INVENTION

1. Field of the Invention

The present invention relates to a membrane electrode composite module, a fuel cell and electronic equipment which include the membrane electrode composite module, and a method of manufacturing the membrane electrode composite module.

2. Description of the Prior Art

In recent years, a fuel cell has been energetically developed as a power supply. The fuel cell has a membrane electrode composite (also referred to as a membrane electrode bonded body) which is formed by sandwiching an electrolyte membrane between gas diffusion electrodes. As described in JP-A-2003-68325 (see paragraph number 0012 to 0035, FIG. 1, and FIG. 2) and Japanese Patent No. 2949153 (see line 46 in the left column on page 3 to line 18 in the right column on page 4, and FIG. 1) for example, the membrane electrode composite is sandwiched by two current collecting plates in order to efficiently draw electric energy from the membrane electrode composite.

It should be noted that, in general, the membrane electrode composite is often used for a polymer electrolyte fuel cell (PEFC). However in the present specification, the kind of fuel cell does not matter, and may be a DMFC, etc., as described in an embodiment described later.

BRIEF SUMMARY OF THE INVENTION

However, as described in JP-A-2003-68325, Japanese Patent No. 2949153 and the like, contact surfaces of the plate-shaped bulky current collecting plates between which the membrane electrode composite is sandwiched are not completely flat, and have irregularities such as microscopic deflection, waviness and warpage. Besides, this conventional current collecting plate is in a plate shape having a certain degree of thickness and thus, has properties of having high rigidity and being difficult to deflect.

Accordingly, when the membrane electrode composite is sandwiched by such current collecting plates, there has been the problem that the current collecting plate and the gas diffusion electrode of the membrane electrode composite do not adhere closely to each other, that is, a gap is generated between the current collecting plate and the gas diffusion electrode. Therefore, there has been the problem that electric energy is difficult to bring out, on the basis of a potential difference generated between the gas diffusion electrodes.

Therefore, the object of the present invention is to provide a membrane electrode composite module in which a membrane electrode composite and current collecting plates are favorably and closely contacted with each other, a fuel cell and electronic equipment provided with the module, and a method of manufacturing the membrane electrode composite module.

As a means for solving the above described problem, the present invention is a membrane electrode composite module including a membrane electrode composite formed by sandwiching both surfaces of an electrolyte membrane between gas diffusion electrodes, an anode current collecting plate having a fuel flow hole through which fuel flows, and a cathode current collecting plate having an oxygen flow hole through which oxygen flows, wherein both surfaces of the above described membrane electrode composite are sandwiched between the above described anode current collecting plate and the above described cathode current collecting plate, characterized in that the membrane electrode composite module further includes a first film made of a synthetic resin which is a base of the above described anode current collecting plate, and a second film made of a synthetic resin which is a base of the above described cathode current collecting plate.

According to this membrane electrode composite module, since the first film made of the synthetic resin which is the base (supporter body) of the anode current collecting plate is provided at the anode side, the anode current collecting plate can be thinned and can be made to have a foil form (film form). Accordingly, the anode current collecting plate becomes easy flexible, and is favorably contacted with the gas diffusion electrode at the anode side constructing the membrane electrode composite, so that an actual contact area is wide. Besides, since the first film as a base is provided, even if the anode current collecting plate is made thin, handling easiness can be ensured.

The same thing applies to the cathode side. Since the second film of the synthetic resin is provided, the cathode current collecting plate can be made thin to enhance flexibility, so that adhesion property of the cathode current collecting plate and the gas diffusion electrode at the cathode side can be enhanced.

Thus, according to this membrane electrode composite module, electric energy can be favorably brought out based on a potential difference occurring in the membrane electrode composite. Further, since the anode current collecting plate and the cathode current collecting plate can be made thin, the thickness of the MEA module, namely, of the fuel cell becomes thin. Furthermore, since the anode current collecting plate and the cathode current collecting plate formed of metal can be made thin, the MEA module, namely, the fuel cell can be made light in weight.

According to the present invention, it is possible to provide the membrane electrode composite module in which the membrane electrode composite and the current collecting plates are favorably contacted with each other, a fuel cell and electronic equipment provided with the module, and a method of manufacturing the membrane electrode composite module.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 1 is a perspective view of a portable terminal of the present embodiment, and shows a mounting situation of a fuel cell;

DETAILED DESCRIPTION OF THE INVENTION

Next, one embodiment of the present invention will be described in detail by suitably referring to FIGS. 1 to 9.

Figure 2:
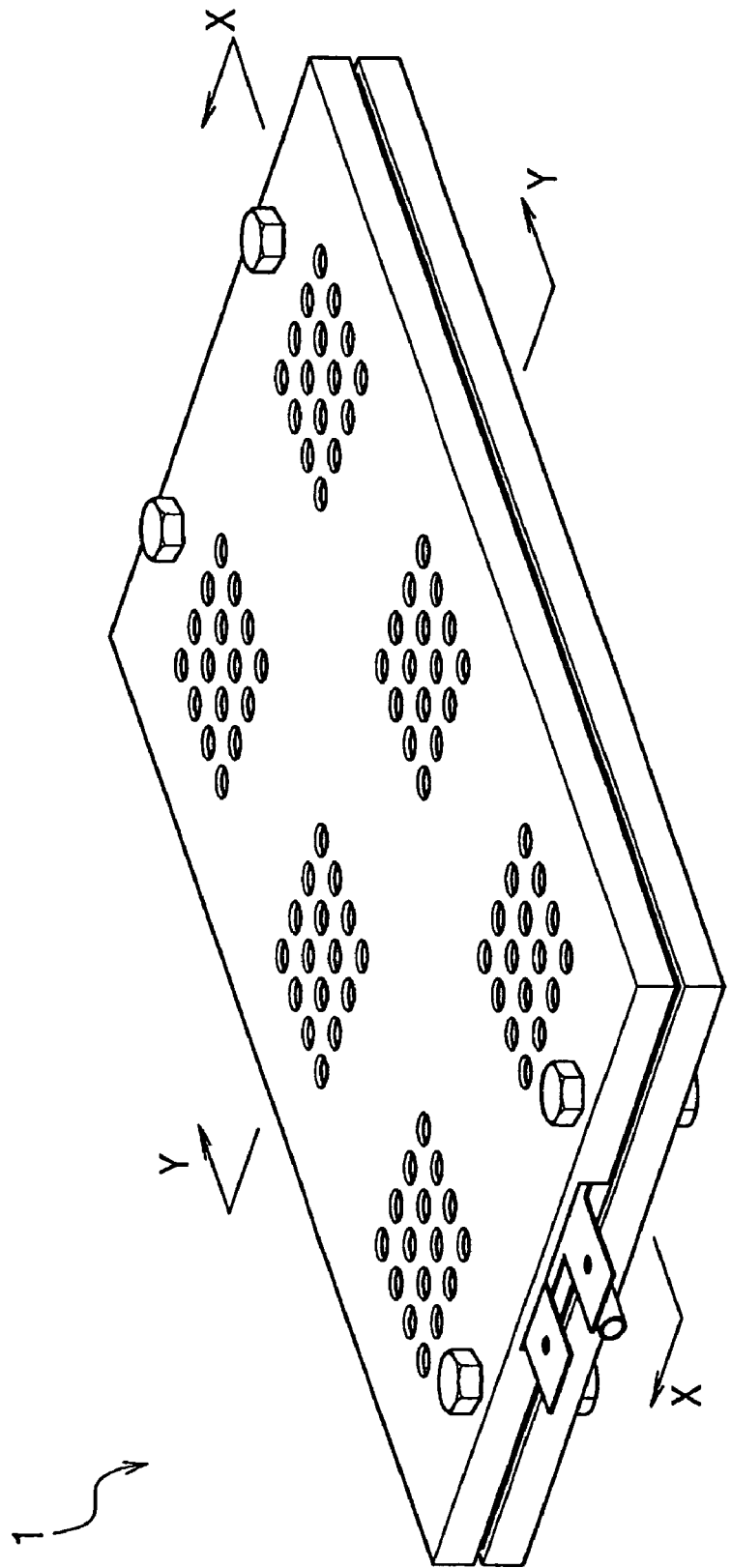
FIG. 2 is a perspective view of the fuel cell of the present embodiment.
Figure 3:
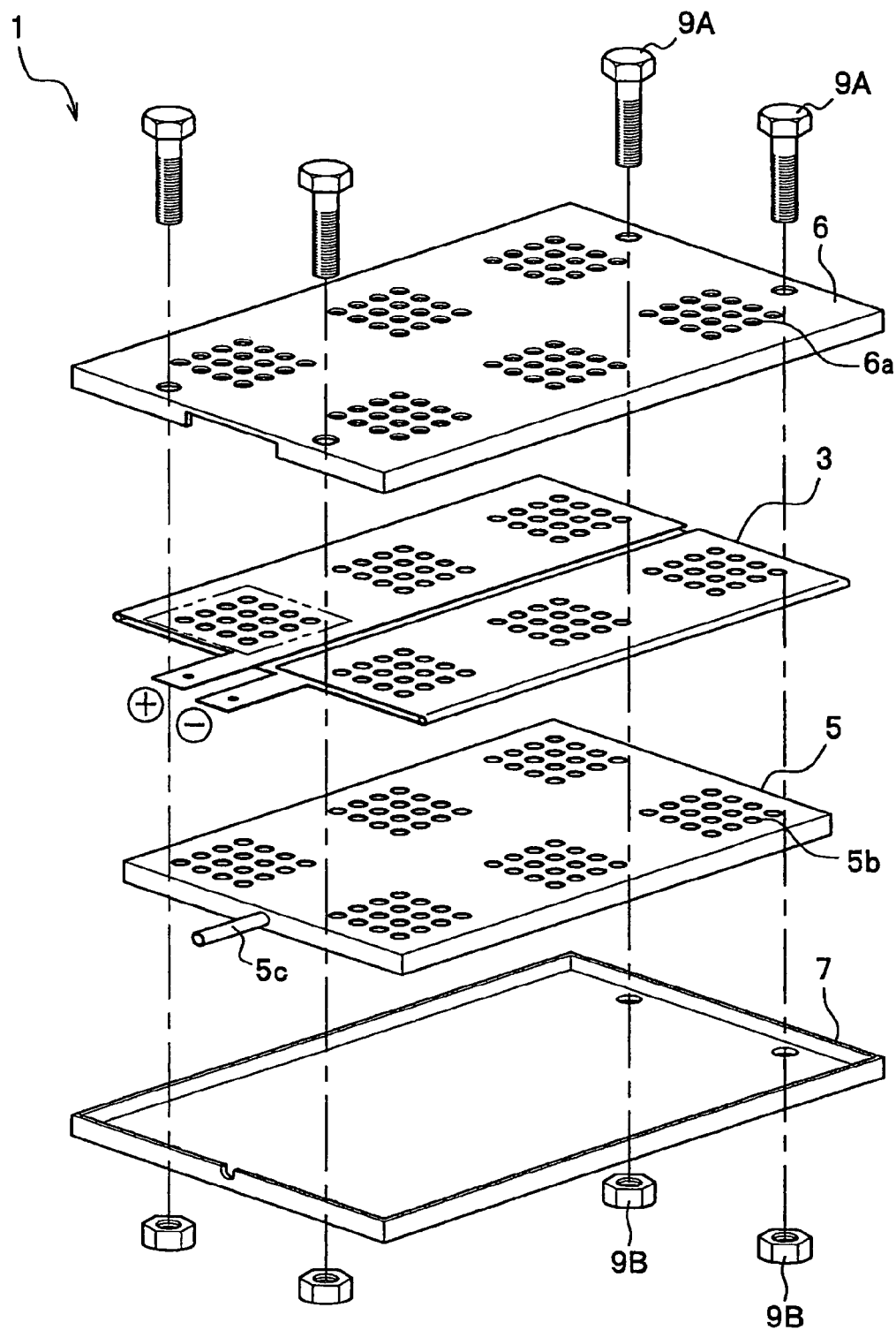
FIG. 3 is an exploded perspective view of the fuel cell shown in FIG. 2.
Figure 4:
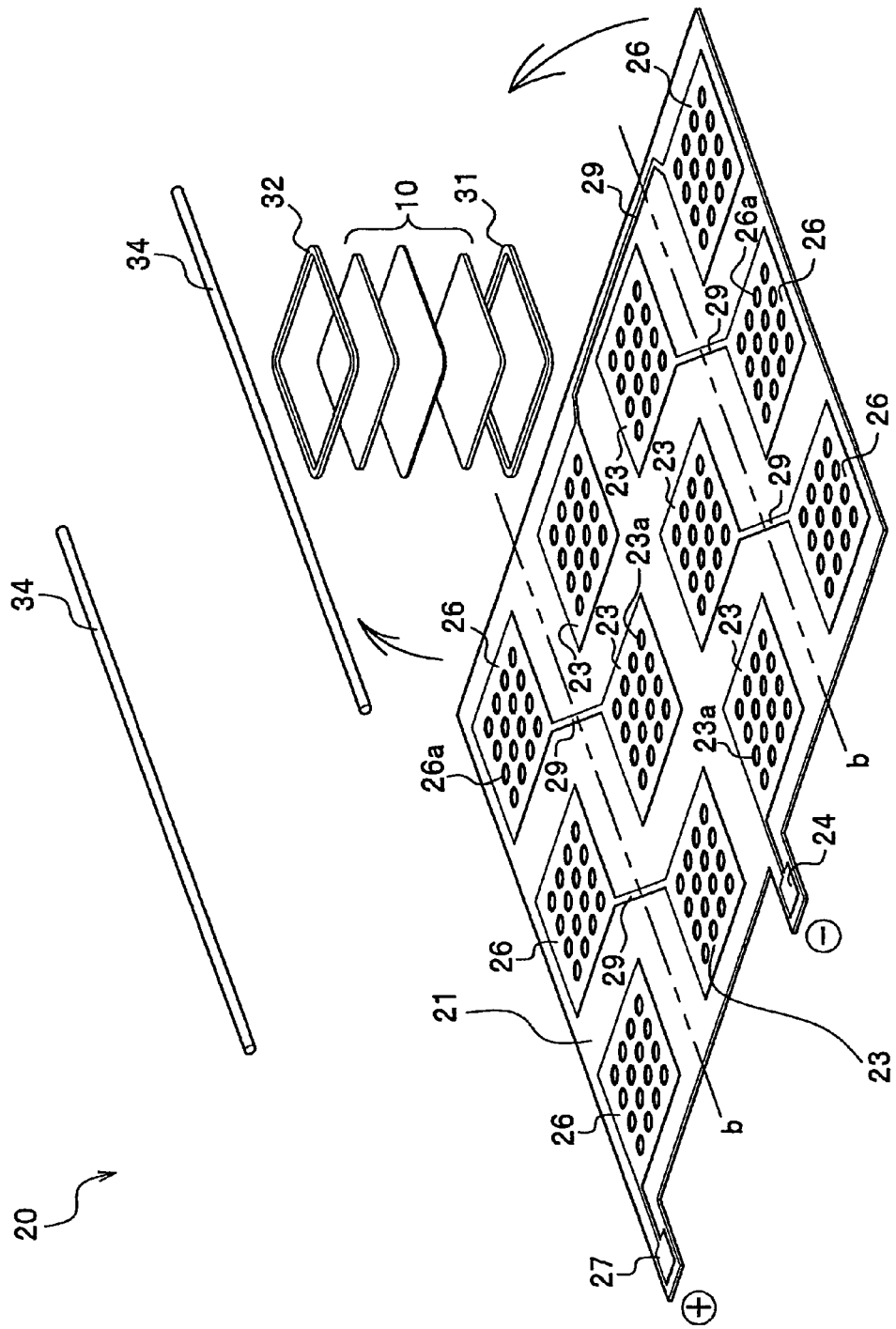
FIG. 4 is a perspective view showing an MEA module shown in FIG. 3 while developing it.
Figure 5:
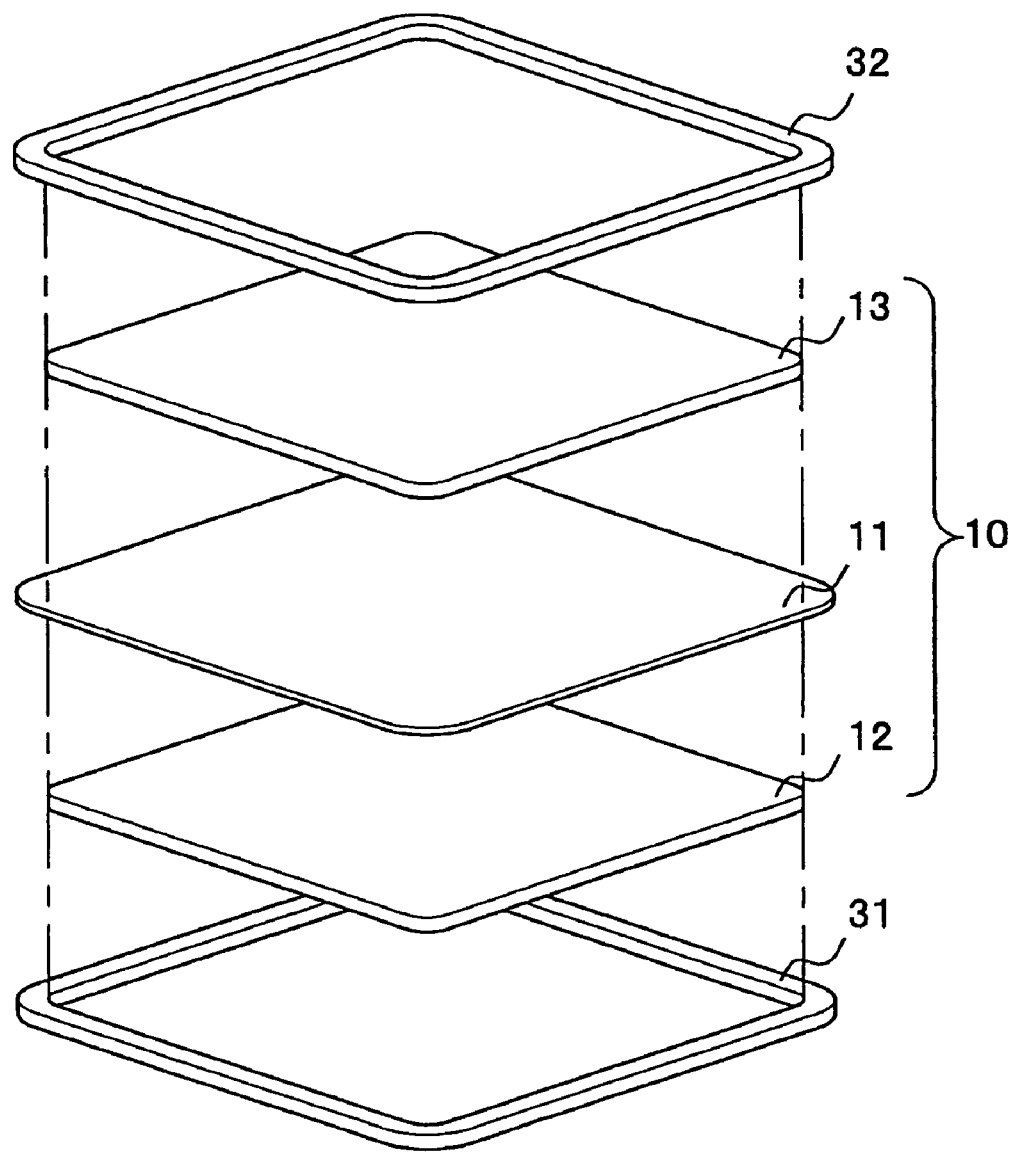
FIG. 5 is a perspective view showing an MEA shown in FIG. 4 while enlarging it.
Figure 6:
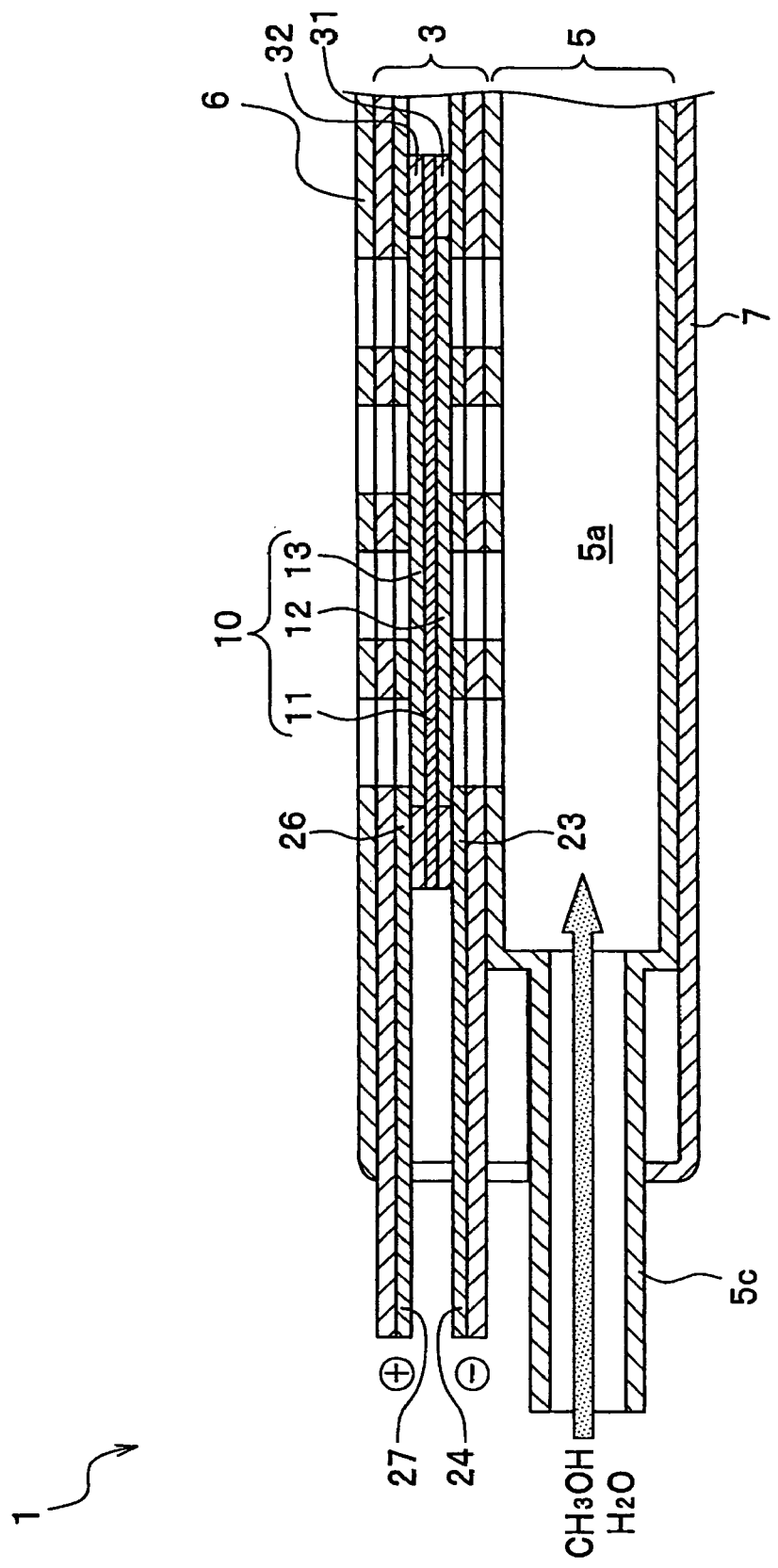
FIG. 6 is a view partially showing an X to X section of the fuel cell shown in FIG. 2.
Figure 7:
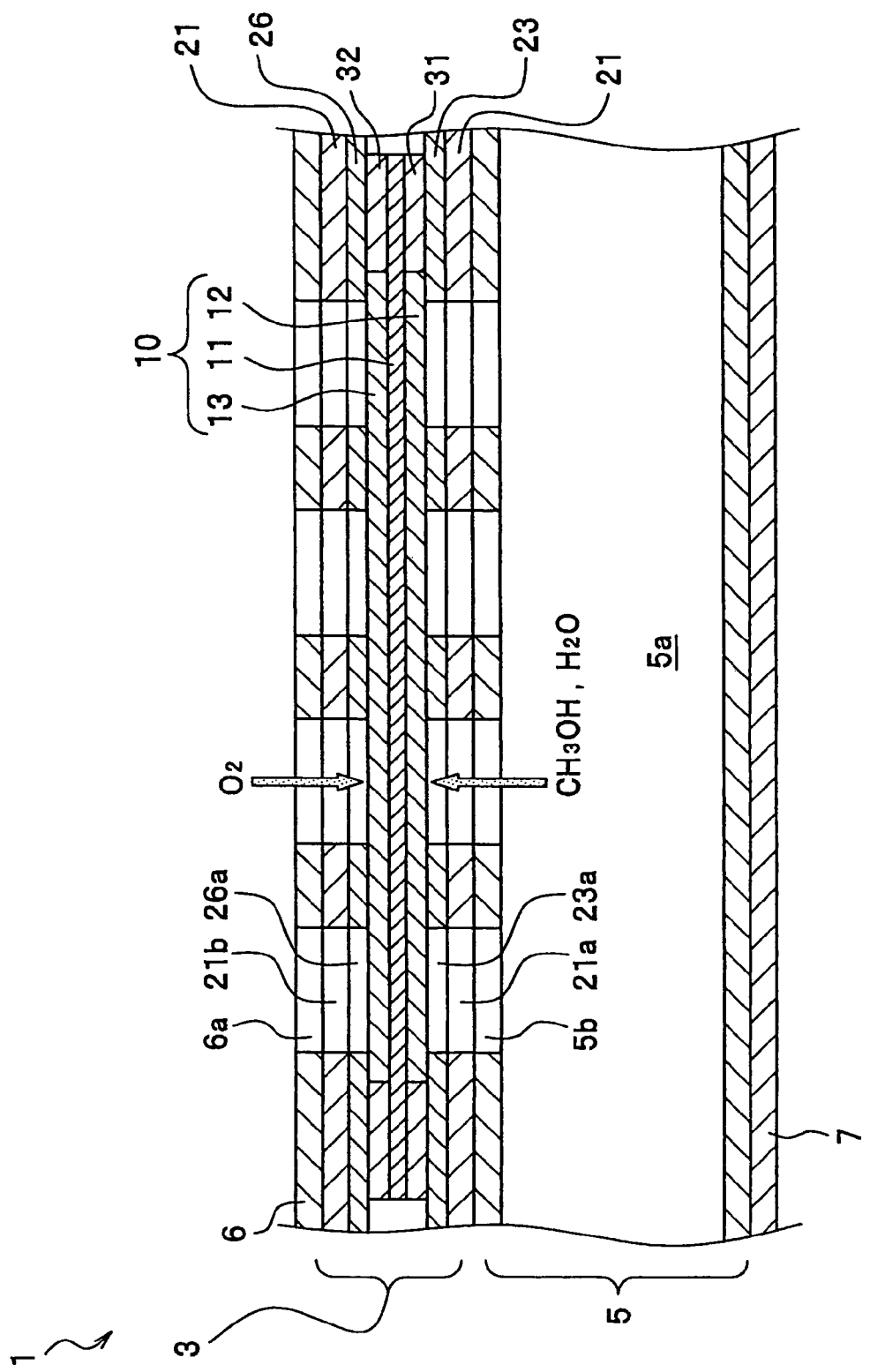
FIG. 7 is a view of the X to X section shown in FIG. 6 which is further expanded.
Figure 8:
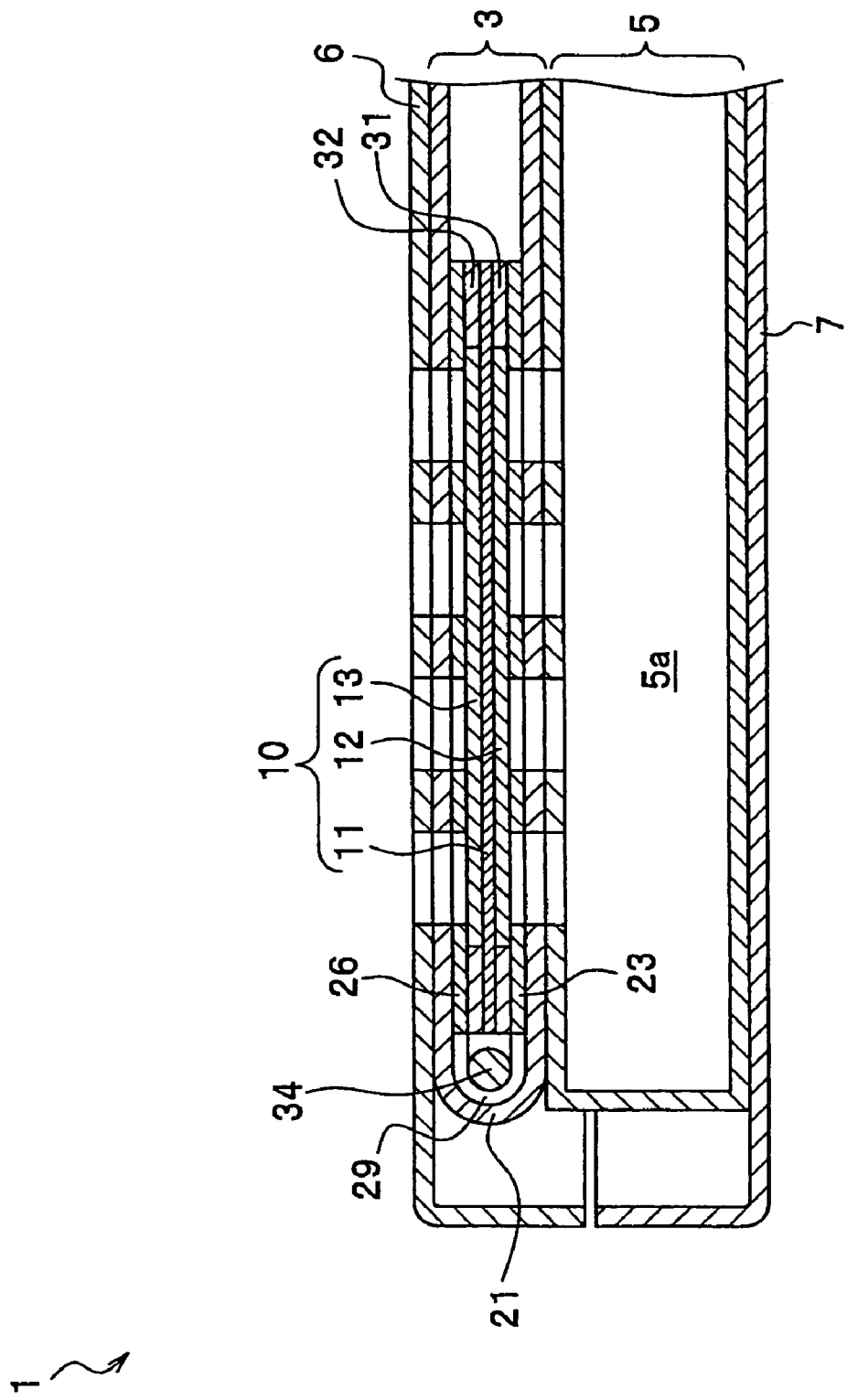
FIG. 8 is a view partially showing a Y to Y section of the fuel cell 1 shown in FIG. 2.
Figure 9A:
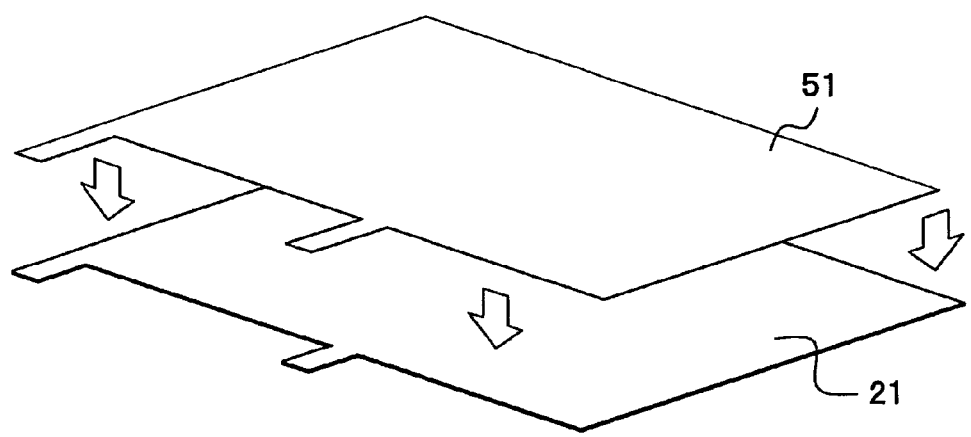
FIG. 9A is one of views showing a method for manufacturing an MEA module 3 according to this embodiment stepwise, and shows a superposing step of a film as a base and a conductive sheet.
Figure 9B:
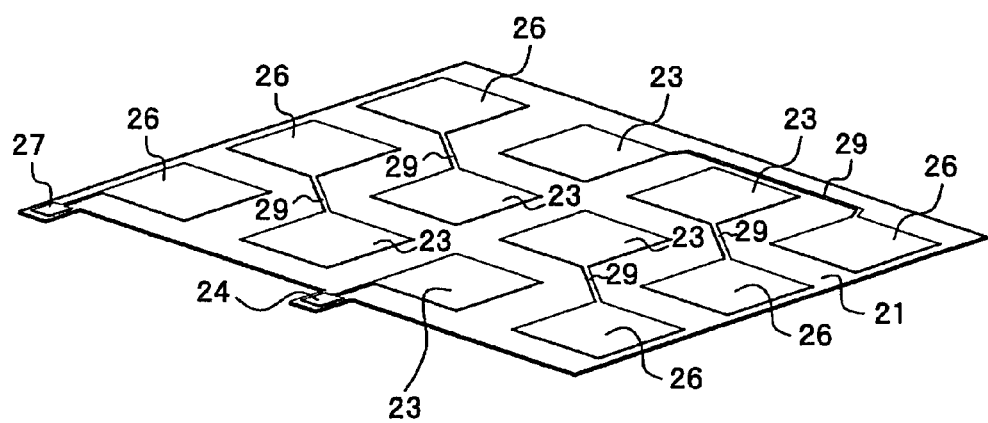
FIG. 9B is one of views showing the method for manufacturing the MEA module 3 according to this embodiment stepwise, and shows an etching step.

In the drawings referred to, FIG. 1 is a perspective view of a portable terminal (electronic equipment) according to this embodiment, and shows a mounting state of a fuel cell. FIG. 2 is a perspective view of the fuel cell according to this embodiment, and FIG. 3 is an exploded perspective view of the same. FIG. 4 is a perspective view showing an MEA module shown in FIG. 3 by developing it. FIG. 5 is a perspective view showing the MEA shown in FIG. 4 by expanding it. FIG. 6 is a view partially showing an X to X section of the fuel cell shown in FIG. 2. FIG. 7 is a view of the X to X section shown in FIG. 6, which is further expanded. FIG. 8 is a view partially showing a Y to Y section of the fuel cell shown in FIG. 2. FIGS. 9A and 9B are views showing a part of a method of manufacturing the MEA module according to this embodiment stepwise, in particularly, FIG. 9A shows a superposing step of a film which is a base, and a conductive sheet, and FIG. 9B shows an etching process step.

1. Portable Terminal

As shown in FIG. 1, a portable terminal P (electronic equipment) according to this embodiment is loaded with a fuel cell 1, and a fuel cartridge (not shown) which supplies fuel to the fuel cell 1. For example, a notebook personal computer, a PDA, a cellular phone, an electronic databook and the like are cited as the portable terminal P. However, electronic equipment loaded with the fuel cell 1 is not limited to the potable terminal P easy to carry, but, it may be a stationary household compact electric power plant (electronic equipment), for example.

2. Construction of Fuel Cell

As shown in FIG. 2, the fuel cell 1 according to a first embodiment is a plate-shaped thin fuel cell which is mounted in the thin portable terminal P such as a notebook personal computer, and is a direct methanol fuel cell (DMFC) which generates power using, as fuel, a methanol solution of about 10 mass % supplied from the above described fuel cartridge.

As shown in FIG. 3, the fuel cell 1 is constructed to include, mainly, an MEA module 3 in which a membrane electrode composite 10 (or a membrane electrode assembly: hereinafter referred to as an MEA) is modularized, a fuel tank 5, an upper casing 6, a lower casing 7 and bolts 9A and nuts 9B. In the fuel cell 1, the upper casing 6, the MEA module 3, the fuel tank 5 and the lower casing 7 are assembled in this sequence form a top, so that the MEA module 3 is sandwiched with a predetermined mechanical compression force, by screwing the bolts 9A and nuts 9B, in cooperation with rigidity of the fuel tank 5. Reference numeral and symbol 5c denotes a fuel intake pipe.

2.1. MEA Module

As shown in FIG. 4 by developing it, the MEA module 3 is constructed to include, mainly, six MEAs 10, a current collecting plate sheet 20 having six pairs of current collecting plates each consisting of an anode current collecting plate 23 and a cathode current collecting plate 26 which sandwich the MEA 10, six annular seal members 31 each of which seals an anode side of each MEAs 10, six annular seal members 32 each of which seals a cathode side, and two core members 34 and 34.

Note that in FIG. 4, one of the MEAs 10 is illustrated by being exploded, and the other five MEAs 10 are omitted. Reference numeral and symbol 23a denotes a fuel flow hole of the anode current collecting plate 23, and reference numeral and symbol 26a denotes an air flow hole of the cathode current collecting plate 26.

2.1.1 MEA

As shown in FIG. 5, the MEA 10 is constructed by an electrolyte membrane 11, a gas diffusion electrode 12 at an anode side, and a gas diffusion electrode 13 at a cathode side.

2.1.1.1 Electrolyte Membrane

The electrolyte membrane 11 is a membrane for selectively transporting protons ($H^+$) generated in the gas diffusion electrode 12 (a fuel electrode, a negative electrode) at the anode side to the gas diffusion electrode 13 (an air electrode, a positive electrode) at the cathode side. As such an electrolyte membrane 11, it is possible to suitably select one from a resin membrane of a perfluoro carbon sulfonic acid (PFS) type, a copolymer membrane of a trifluoro styrene derivative, a polybenzimidazole membrane impregnated with phosphoric acid, an aromatic polyether-ketone sulfonic acid membrane, a membrane made of a PSSA-PVA (polystyrene sulfonate polyvinyl alcohol copolymer), a PSSA-EVOH (polystyrene sulfonate ethylene-vinyl alcohol copolymer), and the like. Above all, a membrane consisting of an ion-exchange resin having a fluorine-containing carbon sulfonic group is preferably selected, and more specifically, Nafion (registered trademark) manufactured made by DuPont Company, USA.

2.1.1.2 Anode Side: Gas Diffusion Electrode

The gas diffusion electrode 12 at the anode side oxidizes methanol which fuel to generate electrons and protons. As a gas diffusion electrode, for example, an electrode in which fine particles of platinum (Pt), fine particles of ferrum (Fe), or fine particles of an alloy or an oxide of platinum and a transition metal such as nickel (Ni), cobalt (Co) or ruthenium (Ru), are carried on one side surface of a conductive member such as carbon paper and a carbon cloth as catalyst is used.

2.1.1.3 Cathode Side: Gas Diffusion Electrode

The gas diffusion electrode 13 at the cathode side allows the electrons, which move from the anode side via an external circuit, to react with the protons, which move in the electrolyte membrane 11 and reaches the gas diffusion electrode 13 at the cathode side after being generated at the gas diffusion electrode 12 at the anode side, to generate water. As such a gas diffusion electrode 13 at the cathode side, for example, the one in which platinum or the like is carried on one side of carbon paper is used similarly to the gas diffusion electrode 12 at the anode side.

2.1.2 Current Collecting Plate Sheet

Returning to FIG. 4, the explanation will be continued.

The current collecting plate sheet 20 effectively brings out electric energy based on a potential difference occurring in the six MEAs 10. The current collecting plate sheet 20 according to this embodiment is constructed to include, mainly, a film 21 (a first film and a second film) made of a synthetic resin, which is a base, six anode current collecting plates 23 and six cathode current collecting plates 26 disposed on the film 21, $A^{th}$ wires 29, 29, ..., which connect the anode current collecting plates 23 and the cathode current collecting plates 26, a bring-out electrode 24 (minus terminal) at the anode side, and a bring-out electrode 27 (plus terminal) at the cathode side.

One anode current collecting plate 23 and one cathode current collecting plate 26 constitute a pair of current collecting plates, and the current collecting plate sheet 20 has six of the above described pairs of current collecting plates. The anode current collecting plates 23 and the cathode current collecting plates 26 are disposed at predetermined positions on the film 21 so that when the current collecting plate sheet 20 is folded at a valley line b, and a valley line b, the six pairs of the current collecting plates respectively sandwich the six MEAs 10 (see FIGS. 6, 7 and 8).

The six anode current collecting plates 23, the six cathode current collecting plates 26, the $A^{th}$ wires 29, the bring-out electrode 24 at the anode side and the bring-out electrode 27 at the cathode side are formed corresponding to the positions of the six MEAs 10, and to the shape in a surface direction of each of the MEAs 10 from one conductive sheet 51 (see FIGS. 9A and 9b, a first conductive sheet and a second conductive sheet) which is pasted on the film 21 with an adhesive as explained in a method of manufacturing the MEA module 3 which will be described later. Accordingly, the amount of metal decreases with respect to the conventional plate-shaped current collecting plate, and the MEA module 3 becomes light in weight, thereby the weight of the fuel cell 1 and the portable terminal P can be decreased.

2.1.2.1 Film

The film 21 (a first film and a second film) which becomes a base is formed from a synthetic resin such as polyimide and PET (polyethylene terephthalate), and has an electrical insulation property. Besides, as shown in FIG. 7, in the film 21, a plurality of communication holes 21a through which the fuel flows, and a plurality of communication holes 21b through which air including oxygen flows are formed corresponding to the positions of the MEAs 10.

Further, the thickness of the film 21 preferably corresponds to the thickness of the MEA module, namely, is 50 μm or less considering the thickness of the fuel cell 1.

2.1.2.2 Anode and Cathode Current Collecting Plates

The anode current collecting plates 23 . . . , the cathode current collecting plates 26 . . . , the bring-out electrode 24 at the anode side, the bring-out electrode 27 at the cathode side, and the $A^{th}$ wires 29 . . . are bonded to the film 21 so as to be integrated. Thereby, the number of components of the current collecting plate sheet 20 becomes small, and the current collecting plate sheet 20 becomes easy to handle.

Namely, even if the anode current collecting plates 23, the cathode current collecting plates 26, the bring-out electrode 24 at the anode side, the bring-out electrode 27 at the cathode side, and the $A^{th}$ wires 29 become thinned, they are integrated with the film 21 which is the base, and therefore, those are easy to handle. Thinning of the anode current collecting plates 23, the cathode current collecting plates 26, and the like leads not only to reduction in weight of the MEA module 3, but also makes the anode current collecting plates 23 and the cathode current collecting plates 26 themselves easy to bend, enhances the adhesion property with the MEAs 10, and makes it possible to efficiently bring out the electric energy.

The $A^{th}$ wires 29 connect the anode current collecting plates 23 and the cathode current collecting plates 26 in a predetermined manner so that the above described six pairs of current collecting plates are connected in series, namely, the MEAs 10 sandwiched by the respective pairs of current collecting plates are connected in series. As shown in FIG. 4, when the current collecting plate sheet 20 is developed, a pair of current collecting plates consisting of one anode current collecting plate 23 and one cathode current collecting plate 26 are insulated, but when the current collecting plate sheet 20 is folded along the valley line b and the valley line b to sandwich the MEAs 10 so that each of the MEAs 10 generates the electric power, those are connected in series, and obtain a potential difference of the sum of the respective potential differences occurring in the six MEAs 10 to be capable of obtaining large electric power.

The bring-out electrode 24 at the anode side is connected to one end of one of the pairs of current collecting plates connected in series in this manner, and the bring-out electrode 27 at the cathode side is connected to the other end. When the fuel cell 1 is loaded on the portable terminal P such as a notebook personal computer, the bring-out electrode 24 at the anode side and the bring-out electrode 27 at the cathode side are connectable to a terminal at the external load (a notebook personal computer or the like) side.

Here, as described above, the six anode current collecting plates 23, the six cathode current collecting plates 26, the $A^{th}$ wires 29, the bring-out electrode 24 at the anode side and the bring-out electrode 27 at the cathode side are formed into a predetermined form from one conductive sheet 51 having electric conductivity (see FIGS. 9A and 9B). Therefore, the anode current collecting plate 23 and the cathode current collecting plate 26 are reliably connected electrically by the $A^{th}$ wire 29.

That is, when the plurality of MEAs 10 are connected to enhance an electric motive force in the prior art, the anode current collecting plate 23 and the cathode current collecting plate 26 have to be connected with a jumper wire by soldering or the like, which requires not only labor for preparation of the jumper wire and the soldering, but also causes the possibility that a crack and peeling occur to the solder connecting portion to cause breaking of wire due to a mechanical vibration or impact, temperature change or the like.

However, according to the MEA module 3 of this embodiment, the $A^{th}$ wires 29 which connect the anode current collecting plates 23 and the cathode current collecting plates 26 are formed to connect the anode current collecting plates 23 and the cathode current collecting plates 26 originally from one conductive sheet 51, and therefore, those are reliably connected electrically, and thus the fear of breaking of wire due to a mechanical vibration or the like is extremely decreased. Thereby, durability of the fuel cell 1 including the MEA module 3 is enhanced.

The plurality of fuel flow holes 23a through which fuel flows are formed corresponding to the position of the MEA 10 in the anode current collecting plate 23. On the other hand, the air flow holes 26a through which air flows are formed corresponding to the position of the MEA 10 in the cathode current collecting plate 26.

As shown in FIG. 7, the position of the fuel flow hole 23a corresponds to the communication hole 21a of the film 21 and the fuel supply hole 5b of the fuel tank 5. The position of the air flow hole 26a corresponds to the communication hole 21b of the film 21 and an air intake hole 6a of the upper casing 6.

The thickness of the anode current collecting plate 23, the cathode current collecting plate 26, the $A^{th}$ wire 29, the bring-out electrode 24 at the anode side, and the bring-out electrode 27 at the cathode side, namely, the thickness of the conductive sheet 51 (see FIG. 9A) in which those are formed is preferably 200 µm or less when considering flexibility while considering electric conductivity and further considering the thickness of the MEA module 3 (namely, the thickness of the fuel cell 1). When the thickness of the anode current collecting plate 23 and the like is thicker than 200 µm, the anode current collecting plate 23 and the like become difficult to bend, the adhesion property of the anode current collecting plate 23 and the gas diffusion electrode 12 at the anode side and the adhesion property of the cathode current collecting plate 26 and the gas diffusion electrode 13 at the cathode side are deteriorated, and it becomes difficult to bring out the electric energy based on an electromotive force generated in the MEA 10.

The anode current collecting plate 23, the cathode current collecting plate 26, the $A^{th}$ wire 29, the anode side bring-out electrode 24 and the cathode side bring-out electrode 27, namely, the conductive sheet 51 in which those are formed is formed from a metal or the like having electric conductivity. As a concrete metal, copper, a copper alloy, titanium, a titanium alloy and the like are cited.

When the anode current collecting plate 23 and the like are made from copper or a copper alloy, gold plating is applied onto the surface thereof, namely, onto the surface on the MEA 10 side. The gold plating prevents electric corrosion of the anode current collecting plate 23 and the like made from copper or a copper alloy as a barrier layer, and reduces electric contact resistance between the respective current collecting plates and the gas diffusion electrodes 12 and 13 of the MEAs 10 to lead to enhancement of the output density of the fuel cell 1. In this case, the thickness of gold plating is preferably in the range of 1 to 5 µm. This is because when it is thinner than 1 µm, durability with respect to the electric corrosion does not sufficiently increase, and when it is thicker than 5 µm, the plating cost becomes too high.

When the anode current collecting plate 23 and the like are formed from titanium or a titanium alloy, electric corrosion can be significantly prevented with respect to the above described anode current collecting plate 23 formed from copper or a copper alloy. However, also in this case, gold plating may be applied to the surface (on the MEA 10 side) of the anode current collecting plate 23 and the like. When the gold plating is applied in this manner, the thickness of the plating is preferably 1 µm or less.

2.1.3 Annular Seal Member

The annular seal member 31 is disposed so as to surround an entire perimeter of the gas diffusion electrode 12 at the anode side, which constitutes each of the MEAs 10, as shown in FIG. 5 and FIG. 7. The annular seal member 32 is disposed to surround an entire perimeter of the gas diffusion electrode 13 at the cathode side of the MEA 10. Accordingly, in the anode side, it is difficult for the fuel, which is supplied to the gas diffusion electrode 12 at the anode side from the fuel tank 5 via the fuel supply hole 5b, the communication hole 21a and the fuel flow hole 23a in this sequence, to leak from an edge of the gas diffusion electrode 12 at the anode side. On the other hand, in the cathode side, it is made difficult for a crossover fuel and generated water to leak from an edge of the gas diffusion electrode 13 at the cathode side.

In the state in which the current collecting plate sheet 20 is folded, the annular seal member 31 at the anode side is bonded to the electrolyte membrane 11 and the anode current collecting plate 23. The gas diffusion electrode 12 at the anode side is disposed in a hollow part of the annular seal member 31.

On the other hand, the annular seal member 32 at the cathode side is bonded to the electrolyte membrane 11 and the cathode current collecting plate 26. The gas diffusion electrode 13 at the cathode side is disposed in a hollow part of the annular seal member 32.

Accordingly, even if a vibration and the like are applied when the fuel cell 1 is transported, for example, the gas diffusion electrode 12 at the anode side and the gas diffusion electrode 13 at the cathode side are restricted in a surface direction of the MEA 10 with respect to the electrolyte membrane 11, and the gas diffusion electrode 12 and the gas diffusion electrode 13 are prevented from being brought into contact with (or approaching) each other without interposing the electrolyte membrane 11, and from shorting out (short circuit), so that the power generating efficiency can be enhanced.

Note that the positions of the annular seal members 31 and 32 may be fixed by fastening the bolt 9A and the nut 9B in a predetermined manner without bonding the annular seal member 31 at the anode side and the annular seal member 32 at the cathode side.

The annular seal members 31 and 32 may be formed from, for example, ethylene propylene diene rubber (ethylene propylene diene methylene: EPDM), or from the other polymer materials on which surface a liquid gasket material is coated.

2.1.4 Core Member

The core member 34 is a member of which external shape is in a columnar shape as shown in FIG. 4 and FIG. 8, and its diameter is in the same order as the thickness of the MEA 10 to which the anode current collecting plate 23 and the cathode current collecting plate 26 are added. Accordingly, the sheet is folded along the core member 34 so that a space corresponding to the above described thickness is easily secured between the opposing anode current collecting plate 23 and the cathode current collecting plate 26, and the MEA 10 is easily sandwiched without generating a spot in which high local pressure is generated.

The outer peripheral surface of the core member 34 is a curved surface, and therefore, the current collecting plate sheet 20 is easily bent along the outer peripheral surface. Namely, a fold line is not made in the $A^{th}$ wire 29 of the current collecting plate sheet 20, and therefore, the $A^{th}$ wire 29 is difficult to break.

2.2. Fuel Tank

As shown in FIGS. 3, 6 and 7, the fuel tank 5 is a secondary fuel tank which temporarily stores the fuel (for example, a methanol solution of 10 mass %) supplied from a separately loaded fuel cartridge (a primary fuel tank) to the portable terminal P loaded with the fuel cell 1, and supplies the supplied fuel to the MEA 10. The fuel tank 5 has a plate-shaped contour, and has a fuel chamber 5a inside there. The fuel tank 5 has a plurality of fuel supply holes 5b, 5b . . . which communicate with the fuel chamber 5a from an outside thereof, and are formed to correspond to the six MEAs 10. Besides, the fuel tank 5 is provided with a fuel intake pipe 5c which connects to the above-described fuel cartridge and takes the fuel into the fuel chamber 5a.

2.3. Upper Casing, and Lower Casing

As shown in FIG. 3, the upper casing 6 and the lower casing 7 provide the function as a casing of the fuel cell, and the function as a protection cover for the MEA module and the fuel tank 5, and is a member for sandwiching the MEA module 3 and the fuel tank 5 to hold those in a closely contacting state. Among those, in the upper casing 6 corresponding to the cathode side of the MEA module 3, a plurality of air intake holes 6a are formed so that air is supplied to the gas diffusion electrode 13 at the cathode side of the MEA 10.

Therefore, according to the fuel cell 1 including such an MEA module 3, the anode current collecting plates 23 and the cathode current collecting plates 26, and the MEAs 10 can be brought into close contact with each other, and therefore, the electric energy can be efficiently brought out of each of the MEAs 10. Since the anode current collecting plate 23 and the cathode current collecting plate 26 can be made thin and these current collecting plates are formed to correspond to the shape of the MEA 10, the MEA module 3, namely, the fuel cell 1 and the portable terminal P are reduced in weight.

Furthermore, according to the MEA module 3 in which a predetermined number of MEAs 10 are modularized (unitized) in this manner, it is easy to combine a plurality of MEA modules 3 in accordance with necessary power supply output of the portable terminal P loaded with the fuel cell 1. The electrolyte membrane 11 and the gas diffusion electrodes 12 and 13, which constitute the MEA 10, are easy to deteriorate with respect to the fuel tank 5 and the like, but the replacement only of such an MEA module 3 becomes facilitated.

3. Operation of Fuel Cell

Next, an operation of the fuel cell 1 according to this embodiment will be described.

First, the description will be made with respect to the anode side of the fuel cell 1.

Fuel such as a methanol solution of about 10 mass % is introduced into the fuel chamber 5a of the fuel tank 5 via the fuel intake pipe 5c from an external fuel cartridge. The introduced fuel is guided to the gas diffusion electrode 12 at the anode side of the MEA 10 via the fuel supply hole 5b of the fuel tank 5, the communication hole 21a of the film 21 and the fuel flow hole 23a of the anode current collecting plate 23.

In the gas diffusion electrode 12, as expressed by the following formula (1), methanol and water react under the presence of a catalyst such as platinum or the like which is carried thereon, and protons ($H^+$), carbon dioxide ($CO_2$), and electrons ($e^-$) are generated. The protons ($H^+$) move in the electrolyte membrane 11 toward the cathode side by the concentration gradient as a driving force. The electrons ($e^-$) are brought out by the bring-out electrode 24.

$$CH_3OH+H_2O \rightarrow CO_2+6H^++6e^- \quad (1)$$

Next, the cathode side of the fuel cell 1 will be described. Air is guided to the gas diffusion electrode 13 at the cathode side of the MEA 10 via the air intake hole 6a, the communication hole 21b and the air flow hole 26a from the outside.

In the gas diffusion electrode 13, oxygen in the air, protons ($H^+$) which move in the electrolyte membrane 11, and the electrons ($e^-$), which move via an external circuit having a load, react so that water is generated.

$$O_2+4H^++4e^- \rightarrow 2H_2O \quad (2)$$

Here, as described above, the anode current collecting plate 23 and the gas diffusion electrode 12, and the cathode current collecting plate 26 and the gas diffusion electrode 13 are favorably adhered respectively, and therefore, the electric energy can be brought out favorably based on a potential difference occurring in each of the MEAs 10.

Besides, the six MEAs 10 are electrically-reliably connected by the $A^{th}$ wires 29, and therefore, in the case of this embodiment in which the MEAs 10 are connected in series, a large electromotive voltage can be provided.

4. Method of Manufacturing Fuel Cell

Next, the method of manufacturing the fuel cell 1 according to the first embodiment will be described.

The method of manufacturing the fuel cell 1 according to the first embodiment includes a module manufacturing step of manufacturing the MEA module 3, and a fuel cell assembling step of assembling the fuel cell 1 by using the MEA module 3.

4.1 MEA Module Manufacturing Step

First, an MEA module manufacturing step will be described.

The MEA module manufacturing step mainly includes a first step of bonding the conductive sheet 51 (the first conductive sheet and the second conductive sheet) made of metal having conductivity, a second step of forming (patterning) the conductive sheet 51 in a predetermined form by a photolithography method, and a third step of disposing the six MEAs 10 in predetermined positions, and folding the current collecting plate sheet 20.

4.1.1 First Step

As shown in FIG. 9A, the conductive sheet 51 such as metal foil is superposed and bonded on a top surface (one side surface) of the film 21 made of a synthetic resin by using an adhesive.

4.1.2 Second Step

Next, as shown in FIG. 9B, by the photolithography method, the conductive sheet 51 is etched, and the anode current collecting plates 23, the cathode current collecting plates 26, the $A^{th}$ wires 29, and the bring-out electrodes 24 and 27 are formed. Namely, an unnecessary part of the conductive sheet 51 is removed by the etching.

The positions of the anode current collecting plates 23, and the cathode current collecting plates 26 are formed corresponding to the MEAs 10 which are sandwiched therebetween. The $A^{th}$ wires 29 are arranged so that the six MEAs 10 are in series when the MEAs 10 are sandwiched by the anode current collecting plates 23 and the cathode current collecting plates 26 respectively. In other words, the $A^{th}$ wires 29 are formed from the conductive sheet 51 so that pairs of current collecting plates each of which is constituted of one anode current collecting plate 23 and one cathode current collecting plate 26 are in series. The bring-out electrodes 24 and 27 are formed from the conductive sheet 51 so as to connect to both ends of the above described pairs of current collecting plates arranged in series, respectively.

Here, the etching is explained more specifically. A photoresist (photosensitive resin) is coated on a top surface of the conductive sheet 51 in a thin film state. Thereafter, the coated photoresist is exposed by using a photo mask on which a predetermined photo mask pattern is formed, and a light source such as a mercury lamp. Thereafter, the photoresist is developed by a developing solution, and after unnecessary photoresist is removed, the photoresist is cleaned with a liquid chemical (rinse solution). Then, after a part of the conductive sheet 51 to which photoresist is not attached is removed (etched) with an HF (hydrofluoric acid) or the like, cleaning is performed using pure water. Finally, only the photoresist is removed by $H_2SO_4/H_2O_2$ or the like, and thereby, the anode current collecting plates 23, the cathode current collecting plates 26, the $A^{th}$ wires 29, and the bring-out electrodes 24 and 27 can be formed at the same time.

Here, a photo mask pattern corresponding to the anode current collecting plates 23, the cathode current collecting plates 26, the $A^{th}$ wires 29, and the bring-out electrodes 24 and 27 is formed in the above described photo mask. The photo mask pattern is inverted in white and black to correspond to the kind of photoresist (photosensitive resin) to be used, namely, to a positive type or a negative type.

As described above, since the anode current collecting plates 23, the cathode current collecting plates 26, the $A^{th}$ wires 29, and the bring-out electrodes 24 and 27 are formed from one conductive sheet 51, those are reliably and electrically connected.

Next, the communication holes 21a and the fuel flow holes 23a through which fuel flows, and the communication holes 21b and the air flow holes 26a through which air flows are formed by punching by a suitable punching device (see FIG. 4). Here, since the anode current collecting plate 23 and the cathode current collecting plate 26 are bonded, there is no fear that the communication hole 21a and the fuel flow hole 23a, and the communication hole 21b and the air flow hole 26a are deviated from each other.

However, the timing in which punching is performed is not limited to this, but the punching may be performed before the first step. Namely, the film 21 in which the communication holes 21a and the communication holes 21b are formed, and the conductive sheet 51 in which the fuel flow holes 23a and the air flow holes 26a are formed may be superposed on each other.

4.1.3 Third Step

Then, the annular seal member 31 is fixed at a predetermined position on a top surface of the anode current collecting plate 23 with an adhesive. After the gas diffusion electrode 12 is fitted into the hollow part of the annular seal member 31, an adhesive is coated on a top surface of the annular seal member 31, and the electrolyte membrane 11 is placed on the top surface, so that the annular seal member 31 and the electrolyte membrane 11 are bonded.

Thereafter, the annular seal member 32 is fixed at a predetermined position on a top surface of the electrolyte membrane 11 with an adhesive. Next, the gas diffusion electrode 13 is fitted into the hollow part of this annular seal member 32.

Such an operation is performed for the six anode current collecting plates 23, respectively.

Thereafter, the core members 34 and 34 are disposed in the valley lines b and b, and after an adhesive is coated on the top surface of each of the annular seal members 32, both end portions of the current collecting plate sheet 20, in which the cathode current collecting plates 26 are disposed, are folded along the core members 34 and 34 to bond the respective cathode current collecting plates 26 and the corresponding annular seal members 32. At this time, the current collecting plate sheet 20 is smoothly folded along the peripheral surfaces of the core members 34 and 34. Then, the MEA module 3 is manufactured.

Besides, when disposing each member on the top surface of the anode current collecting plate 23, it is preferable to enhance positional accuracy by using a jig or the like including a positioning pin. It is preferable to prevent positional displacement of the core member 34 when the core members 34 are fixed to the film 21 along the valley lines b and b with an adhesive, or the core members 34 and the film 21 are relatively fixed with some jigs, and folded.

4.2 Fuel Cell Assemble Step

Next, the fuel cell assemble step will be explained with reference to FIG. 3.

The fuel tank 5 is disposed below the MEA module 3 produced in the above described MEA module manufacturing step, and the lower casing 7 is disposed further below the fuel tank 5. Then, the upper casing 6 is disposed above the MEA module 3. Then, while positioning is performed so that the air intake holes 6a of the upper casing 6, the communication holes 21b, the air flow holes 26a, the fuel flow holes 23a, the communication holes 21a, and the fuel supply holes 5b of the fuel tank are on the same axes with high accuracy, the bolt 9A and the nut 9B are screwed to each other, and the MEA module 3 and the fuel tank 5 are sandwiched between the upper casing 6 and the lower casing 7. Then, the fuel cell 1 is manufactured.

In the above, one example about a preferred embodiment of the present invention is explained, but the present invention is not limited to the above described embodiment, and various changes can be made without departing from the spirit of the present invention.

In the above described embodiment, the bonding method by the adhesive is adopted as a method of fixing the conductive sheet 51 to the film 21 which works as a base, but the present invention is not limited to this, and those may be fixed by previously roughing the contact surfaces of the film 21 and the conductive sheet 51 and then utilizing anchor effect. When those are fixed by utilizing the anchor effect like this, there is no fear of impregnation of an adhesive into fuel, and seeping-out of the adhesive to an outside.

In the above described embodiment, the anode current collecting plates 23 and the cathode current collecting plates 26 are connected so that the six MEAs 10 are connected in series, but the anode current collecting plates 23 and the cathode current collecting plates 26 may be connected so that the six MEAs 10 are connected in parallel.

Figure 10:
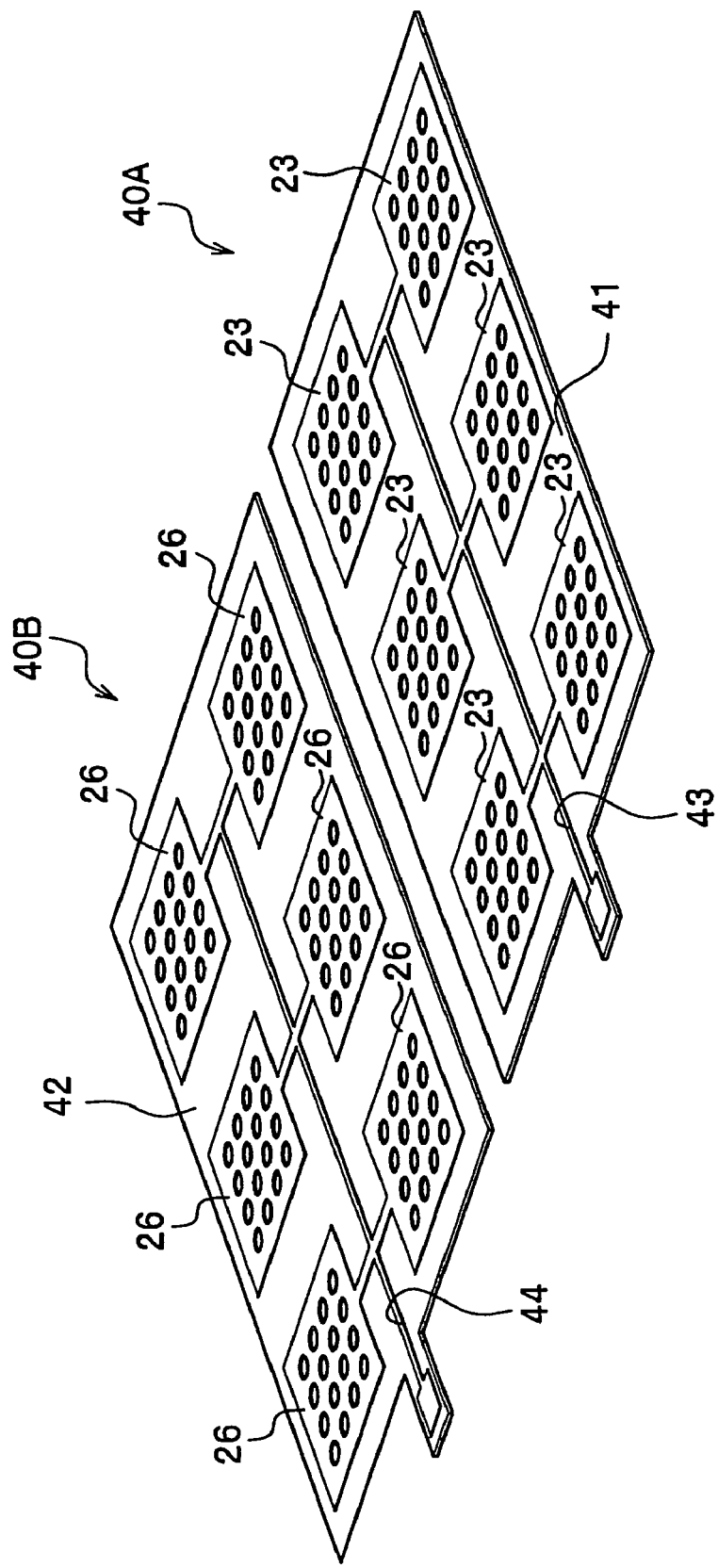
FIG. 10 is a perspective view showing a modification example of a current collecting plate sheet.

In the case of connecting the MEAs 10 in parallel like this, the current collecting plate sheet may be separated into a current collecting plate sheet 40A at the anode side, and a current collecting plate sheet 40B at the cathode side as shown in FIG. 10.

The current collecting plate sheet 40A is configured to include a film 41 which is to be a base, six anode current collecting plates 23 disposed at predetermined positions on a top surface of the film 41, and a $B^{th}$ wire 43 which connects the anode current collecting plates 23. On the other hand, the current collecting plate sheet 40B is configured to include a film 42, six cathode current collecting plates 26 disposed on the top surface of the film 42, and a $C^{th}$ wire 44 which connects the cathode current collecting plates 26. As for the $B^{th}$ wire 43 and the $C^{th}$ wire 44, the $B^{th}$ wire 43 connects the anode current collecting plates 23 to one another, and the $C^{th}$ wire 44 connects the cathode current collecting plates 26 to one another so that the six MEAs 10 sandwiched by the six anode current collecting plates 23 and the six cathode current collecting plates 26 are arranged in parallel.

In other words, in the case of connecting those in parallel, the $B^{th}$ wire 43 is disposed so as to diverge (branch) from one bring-out electrode, and each anode current collecting plate 23 is connected to each end, at the anode side. The same applies to the cathode side, and the $C^{th}$ wire 44 is disposed to branch from one bring-out electrode, and each cathode current collecting plate 26 is connected to each end.

That is, in the above described embodiment, since the six MEAs 10 are connected in series, the anode current collecting plates 23 and the cathode current collecting plates 26 are disposed on one film 21, and the $A^{th}$ wires 29 are disposed to cross the valley lines b and b, but in the case of connecting those in parallel, separate films 41 and 42 may be adopted.

In the case of connecting the MEAs 10 in parallel, the conductive sheets (the first conductive sheet and the second conductive sheet) are bonded onto the films 41 and 42, respectively.

In the case of connecting the MEAs 10 in parallel, other than the method of bonding conductive sheets on the separate films 41 and 42 and thereafter, forming those in a predetermined form like this, one conductive sheet 51 (the first conductive sheet and the second conductive sheet) may be bonded onto one film 21, and after the anode current collecting plates and the cathode current collecting plates are formed from one conductive sheet, the film 21 may be folded as shown in FIG. 9A.

After two conductive sheets (the conductive sheet for the anode current collecting plate (first conductive sheet) and the conductive sheet for the cathode current collecting plate (second conductive sheet)) are bonded to the one film 21, the anode current collecting plates and the cathode current collecting plates are formed from those, and thereafter the film 21 may be folded.

When such a folding method is adopted, and one film 21 is used as the bases of both the anode current collecting plates and the cathode current collecting plates, the current collecting plate sheet produced becomes only one, and is easy to handle because the number of components becomes decreased.

In the above described embodiment, the annular seal members 31 and 32 are disposed at both the anode side and the cathode side of the MEA 10, but the annular seal member 32 at the cathode side may be omitted because methanol which is fuel easily leaks at the anode side (the fuel also leaks from the cathode side when considering crossover).

In the above described embodiment, the MEA module 3 having the six MEAs 10 is described, but the number of MEAs 10 is not limited to this, and is properly, freely changeable. For example, one MEA may be adoptable. When the number of MEAs is changed in this manner, the number of anode current collecting plates 23 and the cathode current collecting plates 26, the size of the fuel tank 5 and the like are also made to correspond to that, properly.

In the above described embodiment, the case of adopting a DMFC as the fuel cell 1 is described, but the kind of the fuel cell is not limited to this, and, for example, a PEFC or the like may be adopted.

In the manufacturing step of the MEA module 3 according to the above described embodiment, as shown in FIGS. 9A and 9B, after the conductive sheet 51 is bonded on the top surface of the film 21 which is the base, the anode current collecting plates 23, the cathode current collecting plates 26, the $A^{th}$ wires 29 and the like are formed by the photolithography method. However, after the anode current collecting plates 23, the cathode current collecting plates 26, the $A^{th}$ wires 29, and the bring-out electrodes 24 and 27 are formed from the conductive sheet 51 by, for example, a pressing method (also called as a press-cut method), the patterned conductive sheet 51 may be bonded onto the film 21. Here, the pressing method is a method of punching the anode current collecting plates 23, the cathode current collecting plates 26 and the like by pressing the dies so as to correspond to the anode current collecting plates 23, the cathode current collecting plates 26 and the like against the conductive sheet 51 at a predetermined pressure.

In the case where the above described MEAs 10 are connected in parallel, the same applies thereto.

In the above described embodiment, the core members 34 and 34 are respectively disposed on the valley lines b and b shown in FIG. 4, whereby a predetermined space is easily ensured between the opposing anode current collecting plate 23 and the cathode current collecting plate 26, but a film (hereinafter, called a spacer film) having six openings corresponding to the six MEAs 10 may be used as a spacer instead of disposing the core members 34 and 34.

More specifically, after the spacer film is disposed to correspond to the six anode current collecting plates 23 of the current collecting plate sheet 20, and the MEAs 10 and the annular seal members 31 and 32 are respectively disposed in the above described six openings of the spacer film, the current collecting plate sheet 20 may be folded on the valley lines b and b to integrate those. By using such a spacer sheet, unnecessary contact of the anode current collecting plates 23, the cathode current collecting plates 26, the bring-out electrodes 24 and 27, and the $A^{th}$ wires 29 can be reliably prevented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A membrane electrode composite module comprising:
   a membrane electrode composite formed by sandwiching an electrolyte membrane between gas diffusion electrodes on both surface sides of the electrolyte membrane;
   an anode current collecting plate having a plurality of fuel flow holes configured to allow fuel to flow therethrough in a direction perpendicular to planes of major surfaces of the anode current collecting plate and the membrane electrode composite; and
   a cathode current collecting plate having a plurality of oxygen flow holes configured to allow oxygen to flow therethrough in a direction perpendicular to planes of major surfaces of the cathode current collecting plate and the membrane electrode composite, the membrane electrode composite being sandwiched between the anode current collecting plate and the cathode current collecting plate on both surface sides of the membrane electrode composite, wherein the membrane electrode composite further comprises:
   a first film made of a synthetic resin, which is a base of said anode current collecting plate and has a plurality of fuel flow holes formed in positions corresponding to the plurality of fuel flow holes of the anode current collecting plate; and
   a second film made of a synthetic resin, which is a base of said cathode current collecting plate and has a plurality of oxygen flow holes formed in positions corresponding to the plurality of oxygen flow holes of the cathode current collecting plate.

2. The membrane electrode composite module according to claim 1, wherein said anode current collecting plate and said cathode current collecting plate are formed so as to correspond to the shape of said membrane electrode composite.

3. The membrane electrode composite module according to claim 2, wherein
   said anode current collecting plate is formed from a first conductive sheet by a photolithography method or a press method, and
   said cathode current collecting plate is formed from a second conductive sheet by the photolithography method or the press method.

4. The membrane electrode composite module according to claim 3, wherein
   said first, film and said second film are the same film, and
   said membrane electrode composite is sandwiched between said anode current collecting plate and said cathode current collecting plate by folding said same film.

5. The membrane electrode composite module according to claim 4, comprising a plurality of said membrane electrode composites, a plurality of said anode current collecting plates and a plurality of said cathode current collecting plates which are formed to correspond to the shapes of the respective membrane electrode composites, and $A^{th}$ wires for connecting said plurality of anode current collecting plates and said plurality of cathode current collecting plates so that said plurality of membrane electrode composites are arranged in series, wherein said first conductive sheet and said second conductive sheet are the same conductive sheet, and said plurality of anode current collecting plates, said plurality of cathode current collecting plates, and said $A^{th}$ wires are formed from said same conductive sheet.

6. The membrane electrode composite module according to any one of claims 1, 4 and 5, wherein said anode current collecting plate and said first film, and said cathode current collecting plate and said second film are bonded, respectively.

7. The membrane electrode composite module according to claim 3 or 4, comprising a plurality of said membrane electrode composites, a plurality of said anode current collecting plates and a plurality of said cathode current collecting plates which are formed to correspond to the shapes of the respectively membrane electrode composites, and $B^{th}$ wires for connecting said plurality of anode current collecting plates and $C^{th}$ wires for connecting said plurality of cathode current collecting plates so that said plurality of membrane electrode composites are arranged in parallel, wherein said $B^{th}$ wires are formed from said first conductive sheet, and said $C^{th}$ wires are formed from said second conductive sheet.

8. The membrane electrode composite module according to claim 7, wherein said anode current collecting plate and said first film, and said cathode current collecting plate and said second film are bonded, respectively.

9. The membrane electrode composite module according to claim 1 or 4, wherein said anode current collecting plate and said cathode current collecting plate are formed from copper or a copper alloy, and are plated with gold on sides facing said membrane electrode composite.

10. The membrane electrode composite module according to claim 9, wherein said anode current collecting plate and said cathode current collecting plate are plated with gold on sides facing said membrane electrode composite sides.

11. The membrane electrode composite module according to claim 1 or 4, wherein said anode current collecting plate and said cathode current collecting plate are formed from titanium or a titanium alloy.

12. The membrane electrode composite module according to claim 1 or 4, wherein said anode current collecting plate and said cathode current collecting plate are plated with gold on sides facing said membrane electrode composite sides.

13. The membrane electrode composite module according to claim 1 or 4, comprising an annular seal member surrounding said gas diffusion electrode, provided on at least one side of said electrolyte membrane.

14. A fuel cell, comprising a membrane electrode composite module according to claim 1 or 4, and a fuel tank for supplying fuel, provided on an anode side of said membrane electrode composite module.

15. A membrane electrode composite module comprising:

a membrane electrode composite formed by sandwiching an electrolyte membrane between gas diffusion electrodes on both surface sides of the electrolyte membrane;

an anode current collecting plate having a fuel flow hole configured to allow fuel to flow therethrough in a direction perpendicular to planes of major surfaces of the anode current collecting plate and the membrane electrode composite; and a cathode current collecting plate having an oxygen flow hole configured to allow oxygen to flow therethrough in a direction perpendicular to planes of major surfaces of the cathode current collecting plate and the membrane electrode composite, the membrane electrode composite being sandwiched between the anode current collecting plate and the cathode current collecting plate on both surface sides of the membrane electrode composite, wherein the membrane electrode composite further comprises:

a first film made of a synthetic resin, which is a base of said anode current collecting plate and has a fuel flow hole formed in a position corresponding to the fuel flow hole of the anode current collecting plate; and a second film made of a synthetic resin, which is a base of said cathode current collecting plate and has an oxygen flow hole of the cathode current collecting plate in a position corresponding to the oxygen flow hole of the cathode current collecting plate;

wherein the anode current collecting plate and the cathode current collecting plate are attached to respective surfaces of the membrane electrode composite so as not to form a space therebetween.

16. The membrane electrode composite module according to claim 15, comprising a plurality of said membrane electrode composites, a plurality of said anode current collecting plates and a plurality of said cathode current collecting plates which are formed to correspond to the shapes of the respective membrane electrode composites, and $A^{th}$ wires for connecting said plurality of anode current collecting plates and said plurality of cathode current collecting plates so that said plurality of membrane electrode composites are electrically connected in series, wherein said first conductive sheet and said second conductive sheet are the same conductive sheet, said plurality of anode current collecting plates, said plurality of cathode current collecting plates, and said $A^{th}$ wires are formed from said same conductive sheet, and said plurality of membrane electrode composites are arranged in a single plane.

* * * * *